United States Patent

Le

Patent Number: 5,451,925
Date of Patent: Sep. 19, 1995

[54] PASSIVE INSTANT AUTOMATIC VEHICLE ANTI-THEFT DEVICE

[76] Inventor: Hy D. Le, 829 Quailbrooke Dr., Arlington, Tex. 76017

[21] Appl. No.: 865,985

[22] Filed: Apr. 9, 1992

[51] Int. Cl.⁶ .......................................... B60R 25/00
[52] U.S. Cl. .................................. 340/426; 340/425.5; 307/10.2; 307/10.3
[58] Field of Search ................. 340/425.5, 426, 528; 307/10.2, 10.3

[56] References Cited

U.S. PATENT DOCUMENTS

| | | | |
|---|---|---|---|
| 3,783,303 | 1/1974 | Johnson, Jr. | 307/10.3 |
| 3,798,398 | 3/1974 | Hills | 200/44 |
| 3,885,164 | 5/1975 | Vest | 307/10 AT |
| 3,936,673 | 2/1976 | Kelly et al. | 307/10 AT |
| 3,956,732 | 5/1976 | Teich | 340/64 |
| 4,023,042 | 5/1977 | Archer et al. | 307/10 AT |
| 4,207,850 | 6/1980 | Wharton | 123/146.5 B |
| 4,232,288 | 11/1980 | Masterman | 340/63 |
| 4,288,778 | 9/1981 | Zucker | 340/426 |
| 4,297,674 | 10/1981 | Merten | 340/63 |
| 4,383,242 | 5/1983 | Sassover et al. | 340/64 |
| 4,580,125 | 4/1986 | Gotanda | 340/426 |
| 4,595,903 | 6/1986 | Arlasky et al. | 340/64 |
| 4,636,651 | 3/1987 | Kilgore | 307/10 AT |
| 4,653,605 | 3/1987 | Goren et al. | 180/287 |
| 4,739,736 | 4/1988 | Branco | 123/179 B |
| 4,745,897 | 5/1988 | Tejeda | 123/198 |
| 4,754,838 | 7/1988 | Cody | 180/287 |
| 4,792,792 | 12/1988 | Costino | 340/64 |
| 4,796,002 | 1/1989 | Heldman, Jr. | 340/428 |
| 4,803,460 | 2/1989 | Rhee et al. | 340/63 |
| 4,842,093 | 9/1989 | Thomas | 307/141 |
| 4,914,314 | 4/1990 | Hirtz | 307/10.3 |
| 4,933,664 | 6/1990 | Igawa et al. | 340/425.5 |
| 4,958,084 | 9/1990 | Carlo et al. | 307/10.2 |
| 4,965,460 | 10/1990 | Tanaka et al. | 307/10.2 |
| 4,985,693 | 1/1991 | Sumami | 340/539 |
| 5,061,915 | 10/1991 | Murphy | 340/426 |
| 5,086,288 | 2/1992 | Stramer | 307/10.3 |
| 5,115,145 | 5/1992 | Westberg et al. | 307/10.3 |
| 5,133,426 | 7/1992 | Niriella et al. | 340/426 |
| 5,172,094 | 12/1992 | Stadler | 340/528 |

Primary Examiner—John K. Peng
Assistant Examiner—Edward Lefkowitz

[57] ABSTRACT

A vehicle passive electronic security control for instant and automatic anti-theft protection which functions without special keys, switches, operator system awareness and does not require active arming or disarming. This invention is easily installed using common tools for electrical and mechanical connections. It cannot be defeated by hot wiring methods. The original ignition key and normal vehicle operating techniques instantly activate or arm and deactivate or disarm this anti-theft invention.

1 Claim, 2 Drawing Sheets

PASSIVE INSTANT AUTOMATIC VEHICLE ANTI-THEFT DEVICE

BACKGROUND—FIELD OF INVENTION

This invention relates generally to a vehicular electronic anti-theft device that does not require operator awareness or action and is automatically triggered instantly by a theft attempt.

BACKGROUND—DESCRIPTION OF PRIOR ART

Excluding the use of the original vehicle owner/operator's key or employing tow away tactics, the illegal operation/theft method of choice is hot wiring or intentionally separating and re-joining selected vehicle wires to start a vehicle and allow its engine to run without the use of a key or the ignition switch. In order to thwart these unauthorized vehicle electronic theft methods, electronic counter-measures are required.

A variety of electronic anti-theft products are currently available. Both after-market (accessory) and O.E.M. (original equipment manufacturer) sources utilize electronic components and designs to disable the vehicle and render it in-operable during theft attempts.

The anti-theft product is not an alarm, warning of a theft attempt through activation of accessory sirens, honking of horns or flashing of lights, but rather a system that temporarily disables the vehicle when a theft attempt is made and prevents unauthorized operation. All known systems of this type are dependent on conscious actions by the operator to enable or arm the unit. This action and related system type is categorized by the term active arm or active enable.

To provide vehicle protection using this design the operator must remember to take precise and often timed or sequenced actions to activate/arm (turn on) the system and often perform additional steps to deactivate/disarm (turn off) the system, thus allowing normal operation. A passive vehicle alarm or anti-theft system requires no conscious effort or non-standard activity by the operator for it's operation.

Insurance companies that offer premium discounts for vehicles that are equipped with alarms increase the percentage of discount for systems that automatically (passively) arm or turn on. The premise of this focus on passive system operation is that a vehicle alarm or any type of theft deterrent functions protectively only if activated. Should the operator forget to actively arm the system or a driver (unaware of the system's presence or functions) be operating the vehicle, the anti-theft protection is lost. The only consistently predictable method of enabling anti-theft protection is thru passive arming.

Several anti-theft systems exist that are marginally passive in operation. While they do not require the use of a switch or electronic transmitter to arm (turn on) or disarm (turn off) the system, their functions are dependant on a variety of actions for proper operation:

(A) The system is disarmed (turned off) by operating the ignition switch in a precise manner and limited elapsed time. An in-experienced or unfamiliar driver can experience difficulty in operating the vehicle due to these system design limitations.

(B) Other anti-theft systems require the use of the power door locks and extreme rotation of door lock cylinders to arm or disarm the unit. Again, this requires conscious and practiced actions from an operator.

These factors (active and semi-passive) arming of current anti-theft systems create less than preferred protection. Fleet, rental and other volume vehicle owner/operators must educate each driver in the proper use of these systems and have confidence that these operators will consistently perform the required arm/disarm actions to achieve any theft protection.

Currently available anti-theft systems disable the starter solenoid or engine coil during the theft attempt. Through conventional known theft techniques, these systems can be overridden by power removal, selective circuit interruptions and alterations to the wiring (ie. hot wiring, jumping) thus allowing illegal operation of the vehicle.

OBJECTIVES AND ADVANTAGES

Several objects and advantages of this invention are:
(A) To provide vehicle anti-theft protection in a true passive arming (system on) and disarming (system off) format.
(B) To provide a passive vehicle anti-theft system to the user that does not require the use of coded (electrically active) ignition keys or special ignition switches.
(C) To provide multiple protection modes including disabled engine cranking, no engine starting and no engine run.
(D) To provide fail safe functions that allows normal vehicle operation even if the anti-theft system fails.

Further objects and advantages of this invention are to provide a vehicle anti-theft system that is easily installed yet difficult and time consuming for a thief to override or remove. This invention will automatically provide effective vehicular anti-theft protection at all times, whereby authorized operators of the vehicle need not be aware the Passive Electronic Security Control System is installed or perform any active arming/disarming functions.

DRAWING FIGURES:

In each figure, significant parts have numerical designations only. Related or interconnecting circuits and parts have the same number but different alphabetic suffixes.

Figure 1:
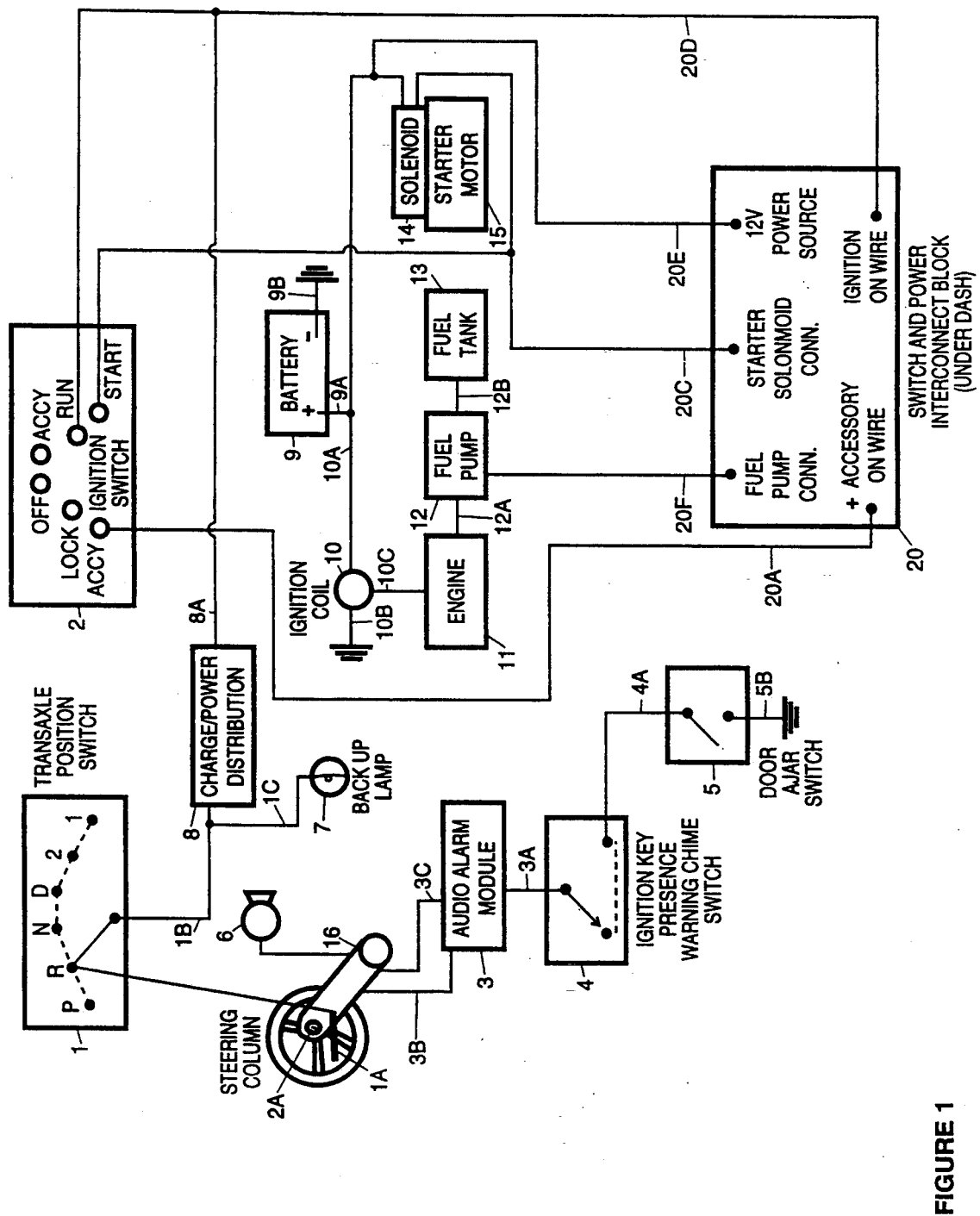
FIG. 1 is a block diagram depicting the electromechanical portions of a gasoline fueled vehicle with electric fuel pump and 12 volt power source that this invention affects.
Figure 2:
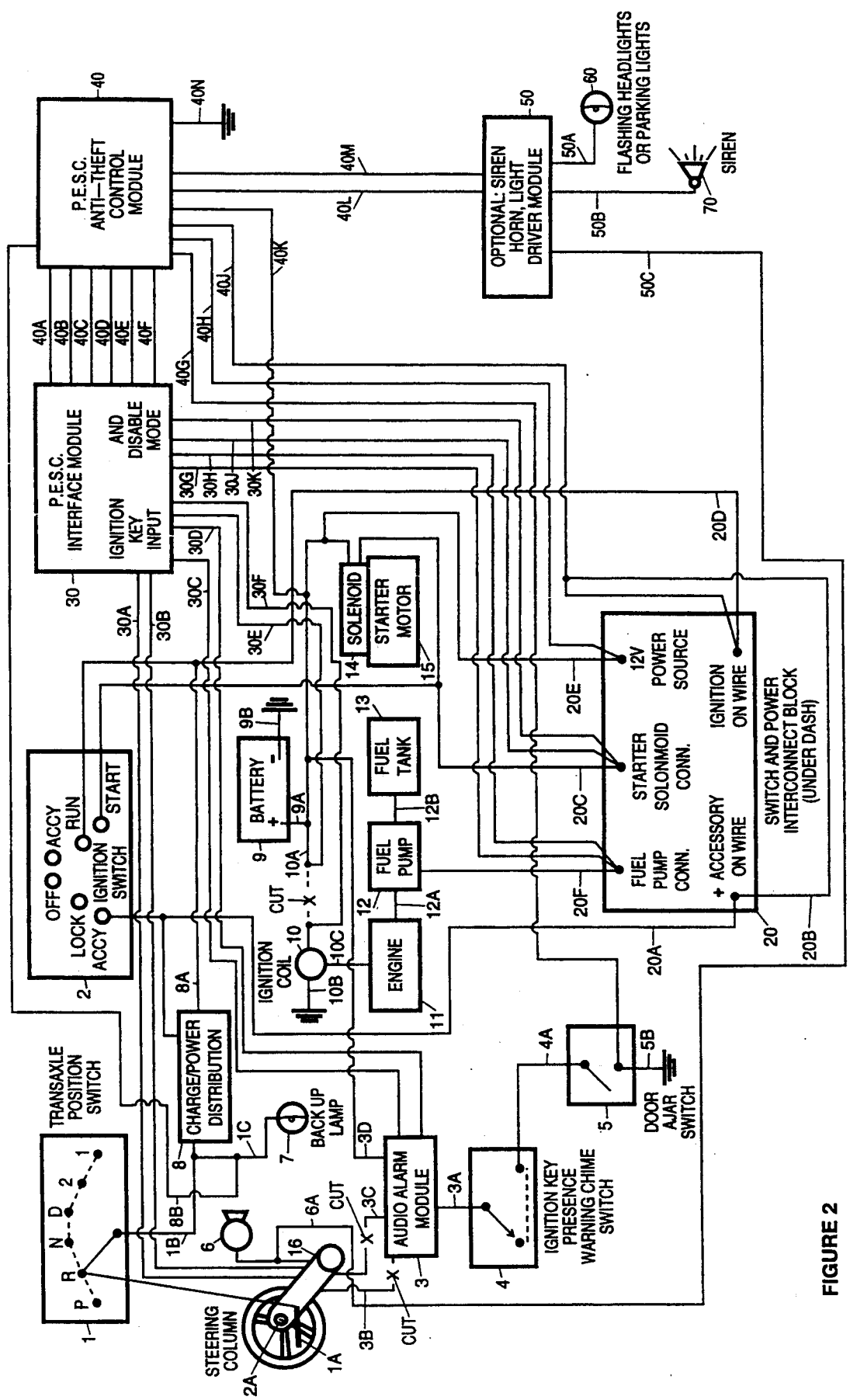
FIG. 2 is a block diagram depicting the same electromechanical portions of a gasoline fueled vehicle with this invention installed and interfaced with the vehicle.

In FIGS. 1 and 2, reference designators 1 and 1A to 1C show the vehicle shift lever, transaxel position switch and interconnecting circuit to the charge/power distribution block and back up lamp 7.

In FIGS. 1 and 2, reference designators 2 and 2A show the external ignition switch and depict the internal functional positions accessed by using the ignition key.

In FIGS. 1 and 2, reference designators 3 and 3A thru 3C show the vehicle audio alarm module 3B and 3C for the interconnecting circuit to the ignition key warning switch 4 and steering column 16.

In FIGS. 1 and 2, reference designators 4 and 4A show the ignition key warning switch and interconnecting circuit to the door ajar switch 5 with vehicle ground connection 5B.

In FIGS. 1 and 2, reference designators 6 and 6A show the vehicle horn and interconnecting circuit to the steering column 16.

In FIGS. 1 and 2, reference designator 7 shows the vehicle back up indicator lamp or lamps.

In FIGS. 1 and 2, reference designators 8 and 8A show the vehicle electrical charge and power distribution module with interconnecting circuits to the ignition on and engine run circuit.

In FIGS. 1 and 2, reference designators 9, 9A and 9B show the vehicle power source (battery) and associated positive voltage and negative or ground circuits.

In FIGS. 1 and 2, reference designators 10 and 10A thru 10C show the vehicle ignition coil and its connections to the battery, vehicle ground and the engine.

In FIGS. 1 and 2, reference designator 11 shows the vehicle engine.

In FIGS. 1 and 2, reference designators 12 shows the vehicle electric fuel pump; inlet fuel line 12B from the fuel tank 13 and the outlet fuel line 12A from the pump to the engine.

In FIGS. 1 and 2, reference designators 14 and 15 show the vehicle starter solenoid and starter motor respectively.

In FIGS. 1 and 2, reference designators 20 and 20A thru 20F show the switch and power interconnect block and the associated accessory, engine start, 12 Volt power, engine solenoid and electric fuel pump circuits and connections.

In FIGS. 1 and 2, reference numerals 1 thru 20 and related alphabetically identified parts or circuits are common to both drawings. Reference numerals 30 thru 70 and related alphabetically identified parts or circuits are shown in FIG. 2 only and show the invention as it is installed and interactive with the vehicle.

Reference numerals in drawings:
1 Vehicle transaxle position switch.
2 Vehicle ignition switch.
3 Vehicle audio alarm module.
4 Vehicle ignition key warning switch.
5 Vehicle door ajar switch.
7 Vehicle back up lamp.
8 Vehicle charge/power distribution block.
9 Vehicle battery.
10 Vehicle ignition coil.
11 Vehicle engine.
12 Vehicle fuel pump.
13 Vehicle fuel tank.
14 Vehicle starter motor solenoid.
15 Vehicle starter motor.
20 Vehicle electrical switch and power interconnect block.
30 This invention; Passive Electronic Security Control for vehicle anti-theft protection interface module with relays and input and output circuitry.
40 Passive Electronic Security Control main module containing the inventions componentry.

DESCRIPTION—REFERENCE NUMBERS 30 and 40:

A typical embodiment of the invention is illustrated in FIG. 2; reference designators 30, 30A thru 30K and 40, 40A thru 40M.

This invention has been installed through mechanical attachment of the modules to the vehicle and electrical connection of all it's system harness wires to selected vehicle wires.

All sources of input signals that affect the state of the anti-theft invention are shown by connecting lines from the particular vehicle component to the modules. These electrical paths are indicated by reference designators 30A thru 30F and 40G thru 40N.

All responsive electrical paths that interact with and disable the normal operation of the vehicle during a theft attempt are indicated by reference designators 40G thru 40K and 30G thru 30K.

Operations—FIGS. 2, 1 thru 40

FIG. 2 illustrates the Passive Electronic Security Control System including the Control Module 40 and Interface Module 30. The Passive Electronic Security Control is powered by a constant +12 VDC 9 source and connected to −12 VDC or vehicle ground 9B. Control Module 40 signal inputs include the back up light wire 1C, ignition wire 20B, and interconnection wires 40D, 40E and 40F from the Interface Module 30. The Control Module output signals include (+) positive 40A and (−) negative 40B circuits to relays contained in the Interface Module 30 and a (−) negative driver output 40C. Interface Module inputs include two chime wires 30C and 30D from the audio alarm module 3 under the dash and inside the vehicle. Two outputs 30G and 30J connect the Interface Module 30 to fuel pump outputs and starter motor connections in the Switch and Interconnect Block 20. Normally closed position circuits 30H and 30K complete the interconnection between relays in the Interface Module 30 and the fuel pump and starter motor positions in the switch and power interconnect block 20. Two output lines 30A and 30B connect the Interface Module 30 to the ignition key warning switch in the steering column 16 wire harness.

When 12 V power 9, 9A and ground 9B are applied to the system and all wire harness connections are made, the invention is operable. If an attempt to start the vehicle is made with out using the proper key in the ignition switch, the invention is instantly triggered and the vehicle will not start. Most attempts to start a vehicle without using a key require temporary connections between wires to send +12 VDC to accessories 20A, ignition "on" 20D and engine start 20C circuits. Attempts to duplicate these connections without using the original ignition switch lock 2A and key will instantly disable the operation modes of the vehicle. The momentary or continued disruption of the Ignition Key Warning Switch 4, Audio Alarm Module 3 and Ignition Switch 2 circuits that occurs during all hot wiring theft attempts is one method of instantly sensing the absence of a valid key and usage of an intact ignition switch. The loss of circuit integrity combined with non-standard engine start, run or vehicle operation causes automatic and instantaneous triggering input to the Control Module 40. The control module 40 will instantly send two negative outputs 40B, 40C and one positive output 40A to the Interface Module 30 driving a combination of three relays to the open position. This condition simultaneously opens the fuel pump circuits 30G, 30H, the starter circuits 30J, 30K and disables the ignition key input 30A and 30B which insures the system can not be disarmed following an illegal attempt to start the vehicle without using the key. This protects the vehicle from continued and varied theft attempts.

Another feature of this invention will reinforce the anti-theft protection should extraordinary hot wire techniques start the vehicle without the key. While the engine will temporarily run normally, as the shifter is moved from the park position to or through the reverse position, the resulting connection of the back up lamp circuit 1C and the +12 VDC signal from the back up lamp circuit 7 also trigger the system instantly and automatically. When the system is triggered by this method, two negative outputs 40B and 40C and one positive output 40A again drive three relays to the open position. The fuel pump circuits 30G and 30H and the starter solenoid circuits 30J and 30K, plus the ignition key input 30A and 30B will simultaneously be interrupted. Consequently, the ignition key will not be able to disarm the system after triggering. To deactivate the triggered condition of the system and regain normal vehicle operation the (+) positive battery terminal must be momentarily disconnected. This power interruption will automatically turn on and rearm the invention for continued protection.

This invention is a totally passive vehicle anti-theft security system. Start the vehicle normally and simultaneously disarm the invention by simply inserting the proper key into the ignition switch. This instantly creates a positive (+) voltage signal or negative (−) voltage signal depending on the vehicle's electrical design. This signal is the input via the audio alarm module 3, ignition key warning switch 4 and door ajar switch 5 to the Interface Module 30 and is instantly transmitted to the Control Module 40 disarming the system and allowing normal vehicle operation. The absence of the key to the ignition key warning switch and resulting loss of signal will instantly and automatically arm (turn on) this invention. If the key remains in the ignition lock after turning off the engine, this system will not arm. Through this design convenience, all normal vehicle operations are enabled by simply using the proper key.

Additional options common to standard vehicle alarms can be incorporated into this invention. These include instant and automatic sounding of sirens, pulsing of the vehicle horn and flashing of parking or head lights. The same functional methods and features previously described that relate to the invention's anti-theft protection when triggered, will also activate these optional warning circuits.

Summary, Ramifications and Scope

There are many vehicle alarm and anti-theft systems designed and available. All of them require the operator to be cognizant of the particular anti-theft or alarm system installed, perform specific tasks to arm or disarm the system or utilize special keys or ignition lock sensing methods. The totally passive design and improved theft deterrent capabilities inherent to this design are unique. Furthermore, The Passive Electronic Security Control has additional advantages in that

- it is completely hidden and uses no extra switches or lamps to control or indicate its readiness.
- it does not require special expensive electronically active ignition keys or ignition switches.
- it is readily installed by competent mechanics but cannot be quickly or easily removed or defeated.

Although the preceding description includes various electronic connections, signals and triggers common to motor vehicles, these are only illustrative examples of some preferred embodiments and configurations of the invention. For example, one or any combination of disabling effects can be incorporated including the vehicle fuel system, engine starting system and engine ignition. Vehicle operations can be immediately disabled and reactive to secondary triggers. Connections and wiring can be of original equipment manufacture type, style and color or universal, etc.

Thus the scope of this invention should be determined by the overall claim and not by examples given.

I claim:

1. A passive anti-theft devices for motor vehicles comprised of electrical componentry and circuitry means responsive to an uncoded ignition key, wherein when said uncoded ignition key is inserted into the vehicle's ignition lock cylinder, said electrical componentry and circuitry means are instantly and automatically closed into continuity by the closing of an ignition key warning switch, which de-energizes said electrical componentry and circuitry means that are in circuit with normally closed relays, which are in turn connected to the vehicle's engine start circuit and electric fuel pump circuit means, so that said normally closed relays which are in continuity with said vehicle's engine start circuit and electric fuel pump circuit means enables normal vehicle operation; and said normally closed relays are instantly and automatically opened into discontinuity, which in turn opens said vehicle's engine start circuit and electric fuel pump circuit means into discontinuity when said ignition key warning switch is opened by the absence of said uncoded ignition key in said vehicle's ignition lock cylinder, energizing said electrical componentry and circuitry means and thereby rendering said vehicle inoperable and protected from theft.

* * * * *